US012718096B2

(12) United States Patent
Niu et al.

(10) Patent No.: US 12,718,096 B2
(45) Date of Patent: Aug. 25, 2026

(54) ENHANCED DISCRIMINATE FEATURE LEARNING DEEP RESIDUAL CNN FOR MULTI-TASK ROTATING MACHINERY FAULT DIAGNOSIS WITH INFORMATION FUSION

(71) Applicant: UNIVERSITY OF SOUTH CAROLINA, Columbia, SC (US)

(72) Inventors: Guangxing Niu, West Columbia, SC (US); Bin Zhang, Irmo, SC (US)

(73) Assignee: UNIVERISTY OF SOUTH CAROLINA, Columbia, SC (US)

( * ) Notice: Subject to any disclaimer, the term of this patent is extended or adjusted under 35 U.S.C. 154(b) by 728 days.

(21) Appl. No.: 18/191,991

(22) Filed: Mar. 29, 2023

(65) Prior Publication Data

US 2023/0351177 A1 Nov. 2, 2023

Related U.S. Application Data

(60) Provisional application No. 63/336,605, filed on Apr. 29, 2022.

(51) Int. Cl.

| | |
|---|---|
| ***G06N 3/08*** | (2023.01) |
| ***G05B 23/02*** | (2006.01) |
| ***G06N 3/0464*** | (2023.01) |

(52) U.S. Cl.

CPC ........... *G06N 3/08* (2013.01); *G05B 23/0283* (2013.01); *G06N 3/0464* (2023.01)

(58) Field of Classification Search

CPC .......... G06N 3/08; G06N 3/02; G06N 3/0464; G06N 3/09; G06N 3/048; G06N 3/082;

(Continued)

(56) References Cited

U.S. PATENT DOCUMENTS

2021/0382120 A1* 12/2021 He ........................ G06F 18/217

FOREIGN PATENT DOCUMENTS

CN 110068462 A * 7/2019 .......... G01M 13/045
CN 114239384 A * 3/2022 ........... G06F 18/253

OTHER PUBLICATIONS

Zhao et al., "Deep Residual Networks With Dynamically Weighted Wavelet Coefficients for Fault Diagnosis of Planetary Gearboxes", IEEE Transactions on Industrial Electronics, vol. 65, No. 5, Oct. 12, 2017, pp. 4290-4300. (Year: 2017).*

(Continued)

*Primary Examiner* — Hwei-Min Lu
(74) *Attorney, Agent, or Firm* — DORITY & MANNING, P.A.

(57) ABSTRACT

Deep learning-based diagnosis methods currently face some challenges and open problems. First, domain knowledge of fault modes and operating conditions are not integrated in most existing approaches, which results in low diagnosis accuracy and training efficiency. Second, existing methods treat all features with indiscriminate attention, which causes unnecessary computation and even false diagnosis results in some cases. Third, multi-task diagnosis becomes more important for health maintenance. To address these challenges, a deep residual convolutional neural network is provided with an enhanced discriminate feature learning capability and information fusion for multi-task bearing fault diagnosis. Domain knowledge is integrated with monitoring data to build the information map. Two attention modules are introduced to enhance the discriminate feature learning ability, and two classifiers are employed for multi-task diagnosis, providing significant improvements in diagnostic accuracy and training efficiency.

29 Claims, 8 Drawing Sheets

(58) Field of Classification Search
CPC ................ G06N 3/045; G05B 23/0283; G05B 23/0259; G05B 23/0205
USPC ..................................................... 706/15, 25
See application file for complete search history.

(56) References Cited

OTHER PUBLICATIONS

Peng et al., "A Novel Deeper One-Dimensional CNN With Residual Learning for Fault Diagnosis of Wheelset Bearings in High-Speed Trains", IEEE Access, vol. 7, Dec. 20, 2018, pp. 10278-10293. (Year: 2018).*
Guo et al., "Multitask Convolutional Neural Network With Information Fusion for Bearing Fault Diagnosis and Localization", IEEE Transactions on Industrial Electronics, vol. 67, No. 9, Sep. 25, 2019, pp. 8005-8015. (Year: 2019).*
Jiao et al., "A comprehensive review on convolutional neural network in machine fault diagnosis", Arxiv Id: 2002.07605, Feb. 13, 2020, pp. 1-49. (Year: 2020).*
Wang et al., "Fault Diagnosis of Bearings Based on Multi-Sensor Information Fusion and 2D Convolutional Neural Network", IEEE Access, vol. 9, 2021, Feb. 3, 2021, pp. 23717-23725. (Year: 2021).*
Liang et al., "Rolling Bearing Fault Diagnosis Based on One-Dimensional Dilated Convolution Network With Residual Connection", IEEE Access, vol. 9,, Feb. 16, 2021, pp. 31078-31091. (Year: 2021).*
Xu et al., "Multireceptive Field Denoising Residual Convolutional Networks for Fault Diagnosis", IEEE Transactions on Industrial Electronics, vol. 69, No. 11, Nov. 11, 2021, pp. 11686-11696. (Year: 2021).*
Nath et al., "Structural Rotor Fault Diagnosis Using Attention-Based Sensor Fusion and Transformers", IEEE Sensors Journal, vol. 22, No. 1, Nov. 23, 2021, pp. 707-719. (Year: 2021).*
Huo et al., A Multisensor Information Fusion Method for High-Reliability Fault Diagnosis of Rotating Machinery, IEEE Transactions on Instrumentation and Measurement, vol. 71, Dec. 21, 2021, pp. 1-12. (Year: 2021).*
Hasan et al., "Bearing Fault Diagnosis Using Multidomain Fusion-Based Vibration Imaging and Multitask Learning", Sensors 2022, 22, 56, Dec. 22, 2021, pp. 1-21. (Year: 2021).*
Bhutto et al., "CT and MRI Medical Image Fusion Using Noise-Removal and Contrast Enhancement Scheme with Convolutional Neural Network", Entropy 2022, 24, 393, Mar. 11, 2022, pp. 1-20. (Year: 2022).*
Liu et al., "Attention Module Magnetic Flux Leakage Linked Deep Residual Network for Pipeline In-Line Inspection", Sensors 2022, 22, 2230, Mar. 14, 2022, pp. 1-24. (Year: 2022).*
Cao et al,, "GCNet: Non-local Networks Meet Squeeze-Excitation Networks and Beyond", in Proceedings of the IEEE/DVF International Conference on Computer Vision Workshops, 2019, 10 pages.
Cerrada et al., "A review on data-driven fault severity assessment in rolling bearings", Mechanical Systems and Signal Processing, vol. 99, 2018, pp. 169-196.
Chen, Zhuyun et al., "A deep learning method for bearing fault diagnosis based on Cyclic Spectral Coherence and Convolutional Neural Networks", Mechanical Systems and Signal Processing, vol. 140, 2020, 16 pages.
Chen, Liang et al., "Adversarial Domain-Invariant Generalization: A Generic Domain-Regressive Framework for Bearing Fault Diagnosis Under Unseen Conditions", IEEE Transactions on Industrial Informatics, vol. 18, No. 3, Mar. 2022, 11 pages.
Chen, Zhuyun, et al., "Multisensor Feature Fusion for Bearing Fault Diagnosis Using Sparse Autoencoder and Deep Belief Network", IEEE Transactions on instrumentation and Measurement, vol. 66, No. 7, Jul. 2017, 10 pages.
Cong et al., "Vibration model of rolling element bearings in a rotor-bearing system for fault diagnosis", Journal of Sound and Vibration, vol. 332, 2013, 17 pages.
Dogo et al., "A Comparative Analysis of Gradient Descent-Based Optimization Algorithms on Convolutional Neural Networks", in 2018 International Conference on Computational Techniques, Electronics and Mechanical Systems (CTEMS), pp. 92-99. IEEE, 2018.
Feng et al., "Domain Knowledge-Based Deep-Broad Learning Framework for Fault Diagnosis", IEEE Transactions on Industrial Electronics, vol. 68, No. 4, Apr. 2021, 11 pages.
Guo et al., "Multitask Convolutional Neural Network With Information Fusion for Bearing Fault Diagnosis and Localization", IEEE Transactions on Industrial Electronics, vol. 67, No. 9, Sep. 2020, 11 pages.
He et al., "Convolutional Neural Networks at Constrained Time Cost", in Proceedings of the IEEE conference on computer vision and pattern recognition, pp. 5353-5360, 2015.
He et al., "Deep Residual Learning for Image Recognition", IEEE Conference on Computer Vision and Pattern Recognition, 2016, 9 pages.
Kingma et al., "Adam: A Method for Stochastic Optimization", arXiv preprint arXiv:1412.6980, 2014.
Li et al., "Sensor Data-Driven Bearing Fault Diagnosis Based on Deep Convolutional Neural Networks and S-Transform", Sensors, vol. 19, 2019, 16 pages.
Li et al., "Fault diagnosis of rolling element bearing weak fault based on sparse decomposition and broad learning network", Abstract Only, Transactions of the Institute of Measurement and Control, vol. 42, No. 2, 2020, 1 page.
Liu et al., "Dislocated Time Series Convolutional Neural Architecture: An Intelligent Fault Diagnosis Approach for Electric Machine", IEEE Transactions on Industrial Informatics, vol. 13, No. 3, Jun. 2017, 11 pages.
Liu et al., "Multiscale kernel Based Residual Convolutional Neural Network for Motor Fault Diagnosis Under Nonstationary Conditions", IEEE Transactions on Industrial Informatics, vol. 16, No. 6, Jun. 2020, 10 pages.
Lu et al., "Intelligent fault diagnosis of rolling bearing using hierarchical convolutional network based health state classification", Advanced Engineering Informatics, vol. 32, 2017, 13 pages.
Niu et al., "A Deep Residual Convolutional Neural Network based Bearing Fault Diagnosis with Multi-Sensor Data", in 2021 4th IEEE International Conference on Industrial Cyber-Physical Systems (ICPS), 2021, 6 pages.
Niu et al., "An optimized adaptive PReLU-DBN for rolling element bearing fault diagnosis", Neurocomputing, vol. 445, 2021, 9 pages.
Pan et al., "An Improved Bearing Fault Diagnosis Method using One-Dimensional CNN and LSTM", Journal of Mechanical Engineering, vol. 64, 2018, 10 pages.
Satija et al., "A Review of Signal Processing Techniques for Electrocardiogram Signal Quality Assessment", IEEE Reviews in Biomedical Engineering, vol. 11, 2018, 17 pages.
Wang et al., "Box-Cox sparse measures: A new family of sparse measures constructed from kurtosis and negative entropy", Mechanical Systems and Signal Processing, vol. 160, 2021, 13 pages.
Wang, Xiaolong et al., "Non-local Neural Networks", IEEE/CVF Conference on Computer Vision and Pattern Recognition, 2018, 10 pages.
Wang et al., "Correlation dimension and approximate entropy for machine condition monitoring: Revisited", Mechanical Systems and Signal Processing, vol. 152, 2021, 8 pages.
Waziralilah et al., "A Review on Convolutional Neural Network in Bearing Fault Diagnosis", MATEC Web of Conferences, vol. 255, EDP Sciences, 2019, 8 pages.
Wen et al., "A New Convolutional Neural Network-Based Data-Driven Fault Diagnosis Method", IEEE Transactions on Industrial Electronics, vol. 65, No. 7, Jul. 2018, 9 pages.
Woo et al., "CBAM: Convolutional Block Attention Module", Proceedings of the European conference on computer vision (ECCV), 2018, 17 pages.
Zhang, Bin et al., "A Probabilistic Fault Detection Approach: Application to Bearing Fault Detection", IEEE Transactions on Industrial Electronics, vol. 58, No. 5, May 2011, 8 pages.
Zhang, Shen et al, "Deep Learning Algorithms for Bearing Fault Diagnostics—A Comprehensive Review", IEEE Access, vol. 8, 2020, 25 pages.

(56) References Cited

OTHER PUBLICATIONS

Zhang, Wei et al., "A New Deep Learning Model for Fault Diagnosis with Good Anti-Noise and Domain Adaption Ability on Raw Vibration Signals", Sensors, vol. 425, 2017, 21 pages.

Zhao et al., "Bearing Health Condition Prediction Using Deep Belief Network", Annual Conference of the Prognostics and Health Management Society, 2017, 8 pages.

* cited by examiner

ENHANCED DISCRIMINATE FEATURE LEARNING DEEP RESIDUAL CNN FOR MULTI-TASK ROTATING MACHINERY FAULT DIAGNOSIS WITH INFORMATION FUSION

PRIORITY CLAIM

The present application claims the benefit of priority of U.S. Provisional Patent Application No. 63/336,605, titled Enhanced Discriminate Feature Learning Deep Residual CNN for Multi-Task Rotating Machinery Fault Diagnosis with Information Fusion, filed Apr. 29, 2022, and which is fully incorporated herein by reference for all purposes.

STATEMENT REGARDING SPONSORED RESEARCH OR DEVELOPMENT

This innovation was made with government support under Grant No. N00174-17-1-0006, awarded by the Naval Engineering Education Consortium (NEEC). The government has certain rights in the innovation.

BACKGROUND OF THE PRESENTLY DISCLOSED SUBJECT MATTER

Structural or component health monitoring is desirable in conjunction with complex systems or devices or interoperative environments.

Rotating components are key components in mechanical and power systems, e.g., bearing, gearbox, engine, wind turbine, motor, pump, generator, transformer, etc. The conditions of these rotating components greatly affect the performance, reliability, and safety of industrial systems. Unexpected rotating component faults may result in breakdown, failure, or damage to industrial systems. Therefore, early and accurate fault diagnosis is critical for condition-based maintenance and logistics, which can significantly reduce the cost of operation and maintenance.

Fault diagnosis of rotating components can be categorized into signal-processing methods, data-driven methods, and hybrid methods[1]-[5]. Data-driven approaches, especially deep learning (DL) based ones, have made a significant achievement in past few years[6],[7]. They show powerful abilities in automatic feature extraction, fault degradation modeling, and fault classification. DL based approaches[8], such as long short-term memory (LSTM)[9], deep belief network (DBN)[10]-[12], and convolutional neural network (CNN)[13], have been widely adopted in rotating component diagnosis. CNN and its variants play dominant roles in DL based bearing fault diagnosis approaches and have attracted more and more interests with demonstrated successes in rotating component fault diagnosis and localization[14]. However, the existing approaches have some limitations to be addressed.

For instance, bearings as critical components of rotating machinery, their faults are the top contributor to the failure of rotating machinery systems. In wind energy systems, about 80% of gearbox failures are caused by bearing faults, about 41% of total faults of induction motors are related to bearings. To ensure the reliability as well as the effectiveness of machine maintenance and logistics planning, and to meet the increasing demands for system safety, reliable and accurate fault diagnosis has resulted in more and more studies in recent years. Take bearing as an example, the global bearing market size was valued at USD 118.7 million in 2020, and it is expected to expand at a compound annual growth rate of 8.5% from 2021 to 2028. There has been a rising demand for bearings with low maintenance requirements, higher efficiency, and longer service life. Therefore, fault diagnosis techniques of rotating components are also in large market demand.

The fault diagnosis techniques of rotating components also face some challenges. First, in practice, most industrial systems are working in variable operating conditions and environments. The information of operating conditions, such as load profile, rotating speed, and environmental factors, etc., in addition to domain knowledge, such as fault mode, fault mechanisms, and fault characteristic frequencies, etc., have significant influence on the accuracy and performance of diagnosis. However, this important information is not utilized or fully considered in most of the existing DL based approaches. As a result, these approaches often cannot guarantee good results for diagnosis with variable operating conditions, environments, and unexpected fault modes. To make full use of these critical information, it is desirable to integrate the operating conditions and domain knowledge to improve the performance, reliability, and robustness of diagnosis.

Second, DL based approaches provide automatic and effective feature learning solutions. The core idea is to learn discrimination fault features from monitoring data by representing a multi-level abstraction of data with deep networks. For rotating components monitoring data, some features are not informative or irrelevant to faults and they will result in low training efficiency or large diagnosis errors. This is especially true for monitoring with multiple and different types of sensors mounted at different locations. The data of these sensors often show different characteristics, and each sensor provides its unique perspective of system health condition, which needs different levels of attention. Unfortunately, most of the existing works lack explicit discriminate feature-learning mechanisms so they give equal attention to all features. This not only introduces unnecessary computation cost but also leads to low training efficiency, especially for diagnosis with data from multi-sensors. To address this problem, discriminate feature attention mechanism is introduced to identify the distinctions of different sensor data and to highlight the fault-related information. Through this mechanism, the feature automatic learning ability can be improved to achieve an improved diagnosis performance.

Third, most diagnosis methods are developed as single task methods for detecting and identifying fault modes. To improve the maintenance efficiency and reduce maintenance cost, more fault information including fault mode, fault location, and operating condition at the time of fault detection are essential. This leads to multi-task fault diagnosis methods in which a single network is able to provide multiple fault related information, such as fault mode, fault location, etc.

More important, when the depth of the CNN structure is increased to deal with monitoring data in complex operating conditions, it causes two problems. One is that a CNN with deeper network depth has a complex structure and more trainable parameters, which makes the training process difficult and time consuming. The other is that it may get saturated, which means it cannot always lead to a better diagnostic performance. These issues can be addressed by a deep residual convolutional neural network (DR-CNN) structure[15].

In summary, the existing rotating component fault diagnosis methods have some limitations in terms of the integration of discriminate feature learning, domain knowledge and operating condition information, multi-task fault diagnosis.

SUMMARY OF THE PRESENTLY DISCLOSED SUBJECT MATTER

Aspects and advantages of the presently disclosed subject matter will be set forth in part in the following description, or may be apparent from the description, or may be learned through practice of the presently disclosed subject matter.

Broadly speaking, the presently disclosed subject matter relates to rotating components, multi-task fault diagnosis, feature attention, and deep residual convolutional neural networks. Thus, as noted, the proposed technique can be applied to different rotating machinery, of which a bearing is just one application. Some examples are bearing, gearbox, engine, wind turbine, motor, pump, generator, transformer, etc.

More particularly, based on above-mentioned motivations, the presently disclosed subject matter aims to develop an enhanced discriminate feature learning-based DR-CNN structure for multi-task rotating components diagnosis with information fusion.

To solve these existing challenges, this presently disclosed innovation discloses a DR-CNN based multi-task fault diagnosis method with discriminate feature learning and information fusion. The raw data from multi-sensors are converted and fused with domain knowledge to build the information maps. Two different attention modules are employed to enhance the fault related discriminate features learning ability. The constructed discriminate feature attention DR-CNN structure with two classifiers is assembled and trained with a dynamic training procedure using the fused information maps. The verification results show that the method can achieve high training accuracy, fast convergence speed, and high diagnosis accuracy in rotating component's fault diagnosis. Some examples of the applications of the proposed method are fault diagnosis tasks of wind turbines, helicopters, engine, power generators, and motors, etc.

Different from the previous works[16], the presently disclosed subject matter integrates domain knowledge, operating conditions, and data from multiple sensors in a dynamic training process to enhance the performance of multi-task diagnosis. Although domain knowledge is considered in some existing works[17]-[19], they often lack discriminate feature learning capability and do not consider human-involved feature extraction. To address the limitations, this work adopts two feature attention modules, channel attention module (CAM) and non-local attention module (NLAM), to improve the discriminate feature learning ability. For some presently disclosed embodiments, some features are summarized as follows: 1) Explores the attention mechanism in multi-task DR-CNN to improve fault diagnosis performance in terms of model training efficiency and accuracy; 2) Fuse domain knowledge with multiple sensor data to get fast convergence and high accuracy; and 3) Achieve two classification tasks simultaneously by one network with a single training process. The presently disclosed subject matter is verified on two case studies with data from multiple sensors to demonstrate its effectiveness and accuracy.

Deep learning-based methods are widely used in rotating component fault diagnosis. The presently designed DR-CNN based method is capable of enhanced discriminate feature learning capability and can provide multiple fault-related information using a single network. This presently disclosed innovation developed an enhanced discriminate feature learning-based DR-CNN for multi-task diagnosis with information fusion. To further improve the network training efficiency and diagnosis accuracy, this disclosed subject matter, in some embodiments thereof, adopts two feature attention modules, CAM and NLAM, to improve the discriminate feature learning ability.

Other exemplary aspects of the presently disclosed subject matter may include as follows: 1) details of the design and implementation of the disclosed method, including information fusion, discriminate feature attention, and multi-task fault diagnosis; 2) theoretical knowledge and background regarding the presently disclosed method; and 3) information and data/descriptions regarding experiments, analysis, discussion, and comparison studies to validate the effectiveness of the presently disclosed method.

Still further aspects of the presently disclosed subject matter relate to exploring the attention mechanism in multi-task DR-CNN subject matter to improve fault diagnosis performance in terms of model training efficiency and accuracy. Other presently disclosed aspects relate to fusing domain knowledge with multiple sensor data to get fast convergence and high accuracy. Some presently disclosed embodiments relate to achieving two classification tasks simultaneously with use of one network with a single training process. The present disclosure, in parts, also relates to verifying the presently disclosed method via different bearing cases with multi-source data.

One presently disclosed exemplary methodology preferably relates to a method for bearing fault diagnosis. Such exemplary method may preferably comprise receiving raw monitoring data from at least one monitoring sensor associated with one or more operating bearings; pre-processing the raw monitoring data to generate pre-processed monitoring data; fusing the pre-processed monitoring data with bearing fault domain data to build fused information maps; processing the fused information maps through a machine-learned enhanced discriminate feature learning based deep residual convolutional neural network (DR-CNN) model trained to diagnosis bearing faults from fused information maps; and providing, as an output of the DR-CNN model, one or more sets of fault information regarding the one or more operating bearings.

Another presently disclosed exemplary embodiment may relate to a method of training an enhanced discriminate feature learning based multi-task CNN for bearing fault diagnosis. Such exemplary methodology may preferably comprise partitioning into segments 1-dimensional (1-D) monitoring data samples from bearing monitoring sensors associated with one or more monitored bearings; converting the bearing monitoring data segments from different sensors into 2-dimensional (2-D) grayscale images; transforming a set of domain knowledge about bearing operations and bearing faults into information maps; integrating the grayscale images with the information maps to build fused information images, which are used as input to a multi-task deep residual convolutional neural network (DR-CNN) having multiple classifiers for multi-task diagnosis; and training the DR-CNN with the fused information images by using a dynamic training strategy to learn bearing diagnosis.

Yet another exemplary embodiment relates to a method of using such above-referenced trained DR-CNN to conduct bearing fault diagnosis, comprising providing input data sets of monitored bearing sensor data to the trained DR-CNN, and operating the DR-CNN for outputting bearing fault diagnosis based on such monitored bearing sensor data.

Other example aspects of the present disclosure are directed to systems, apparatus, tangible, non-transitory computer-readable media, user interfaces, memory devices, and electronic smart devices or the like. To implement methodology and technology herewith, one or more processors may be provided, programmed to perform the steps and functions as called for by the presently disclosed subject matter, as will be understood by those of ordinary skill in the art.

It is to be understood from the complete disclosure herewith that the presently disclosed subject matter equally relates to both apparatus and corresponding and related methodology.

One presently disclosed exemplary embodiment relates to a system for rolling element bearing fault diagnosis. Such a system may preferably comprise one or more processors programmed for receiving raw monitoring data from at least one monitoring sensor associated with one or more operating bearings, pre-processing the raw monitoring data to generate pre-processed monitoring data, and fusing the pre-processed monitoring data with bearing fault domain data to build fused information maps; and a machine-learned enhanced discriminate feature learning based deep residual convolutional neural network (DR-CNN) model trained to diagnose bearing faults from fused information maps, for receiving and processing the fused information maps from the one or more processors, for outputting one or more sets of fault information regarding the one or more operating bearings.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the Figures or stated in the detailed description of such Figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, directed to one of ordinary skill in the art, is set forth in the specification, which makes reference to the appended Figures, in which.

Figure 1:
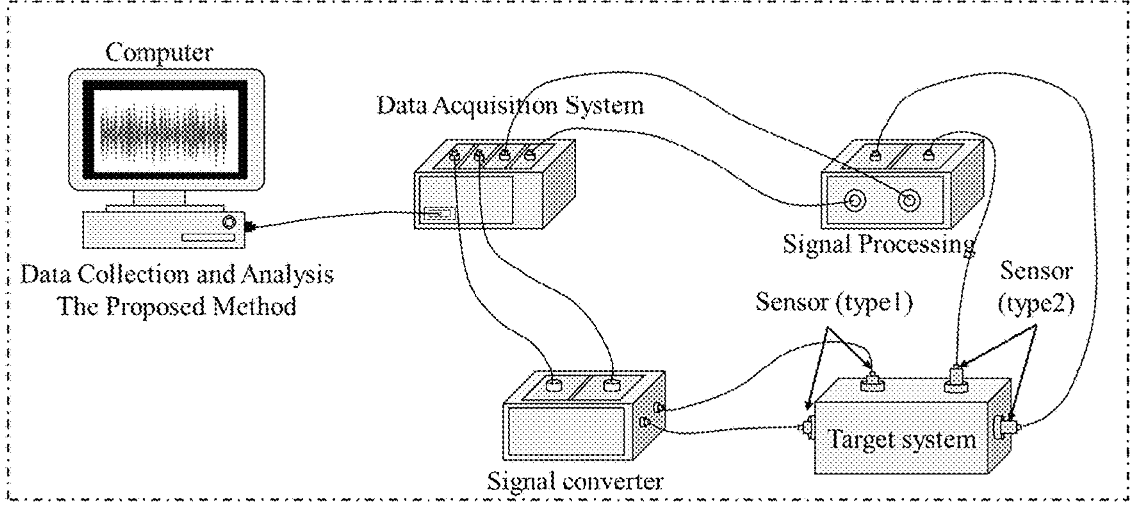
FIG. 1 is an illustration of the configuration of a Machinery fault simulator-rotor dynamics simulator (MFS-RDS) for use in accordance with the presently disclosed subject matter.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

It is to be understood by one of ordinary skill in the art that the present disclosure is a description of exemplary embodiments only and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

The present disclosure is generally directed to enhanced discriminate feature learning based multi-task convolutional neural network (CNN) subject matter.

Figure 2:
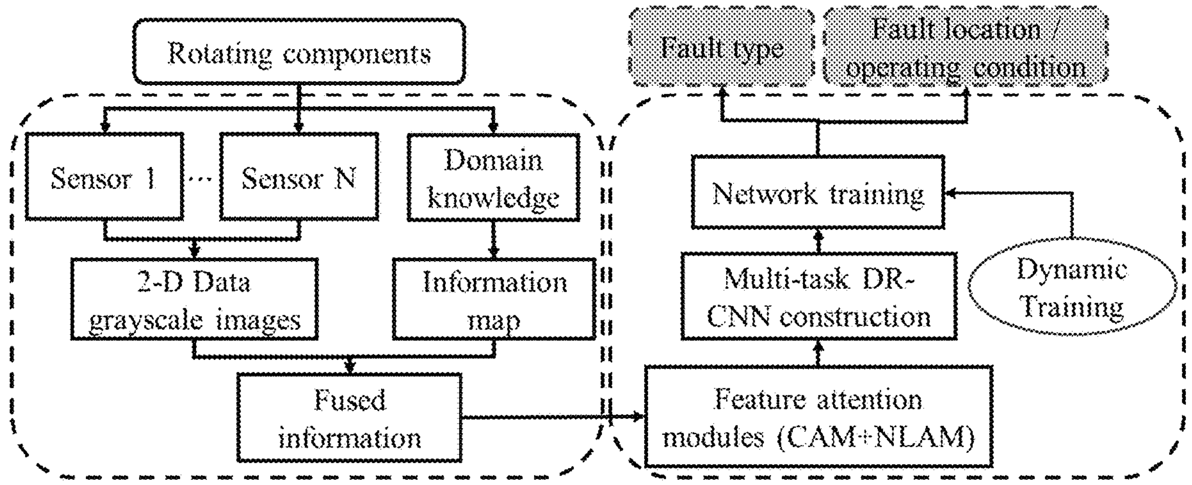
FIG. 2 illustrates a schematic diagram of an exemplary embodiment of an overall framework of the presently disclosed enhanced discriminate feature learning based multi-task CNN subject matter.

More specifically, an exemplary embodiment of the overall framework of the disclosed enhanced discriminate feature learning based multi-task CNN is shown in FIG. 2. The disclosed method consists of data pre-processing, information fusion, feature learning with discriminate feature attention mechanisms, and fault diagnosis. Note that reference to the specific example of "bearing" herein may also be thought of more generally as reference to rotating components or rotating machinery. The detailed implementation process is described as follows:

Step 1) Partition the 1-dimensional (1-D) monitoring data into segments based on the sampling rate and the bearing rotating speed. The obtained data samples are then split into training and testing sets.

Step 2) Convert the bearing monitoring data segments from different sensors into 2-dimensional (2-D) gray-scale images and transform the domain knowledge into information maps. The data images are then integrated with information maps to build the fused information images, which are used as the input to the disclosed multi-task DR-CNN.

Step 3) Construct the discriminate feature attention-based DR-CNN with multiple classifiers for multi-task diagnosis. The structure and parameters of the network are first initialized based on the input and tasks, and then trained with the fused information images by using a dynamic training strategy.

Step 4) If the performance satisfies the pre-defined requirements or the training epoch reaches the threshold, the training process is finished.

Step 5) The trained DR-CNN is verified on the test data sets. The performance is analyzed and compared with other recently reported bearing fault diagnosis techniques to demonstrate the effectiveness of the disclosed method.

I. THE DISCLOSED APPROACH

A. Discrimination Feature Attention

1) Channel Attention Module (CAM): Convolution operation can be used to recognize fault features from the input images or feature maps from previous layers in different scales by different kernels. A wealth of feature information is provided in the monitoring data. However, some features are not related to the fault or even indicate false information due to interference signals. To address this problem, CAM is introduced to enhance the fault related information extraction ability. In CAM, feature attention maps are obtained by exploring the inner-channel relationship of features[20].

Figure 3:
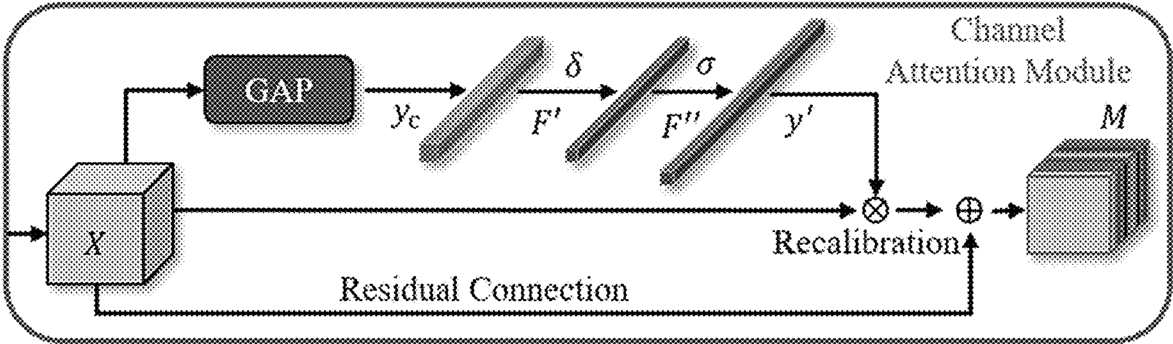
FIG. 3 illustrates a schematic diagram of an exemplary embodiment of a Channel Attention Module (CAM) for use in the presently disclosed exemplary embodiment of subject FIG. 2.

FIG. 3 shows the structure of the CAM. The main idea is to distinguish different features among different channels of convolution operation and improve the network sensitivity by explicitly modeling the importance of channels. In this Figure, $X=[x_1, x_2, \ldots, x_c]$ is a combination of convolution channels with $x_i$ being the convolution map obtained by the i-th convolution channel and c is the number of convolution kernels. Note that X is obtained by applying convolution operation on the fused bearing information images (built from monitoring data and domain knowledge, FIG. 2). Convolution operation is used to extract features in different scales from the input information images. The features are compressed by a global average pooling (GAP) layer with the pooling filter size being H×W, where H and Ware the width and height of the convolution map x, respectively. The channel-wise statistics vector $y_c$ can be obtained as:

$$y_c = GAP(x_c) = \frac{1}{H \times W}\sum_{i=1}^{H}\sum_{j=1}^{W} x_c(i, j) \quad (1)$$

The channel recalibration weight vector y' is defined as $$y' = \sigma(F''(\delta(F'(y)))) \quad (2)$$

where δ is the Rectified Linear Unit (ReLU) activation function, σ is the Sigmoid function, F' and F" are the convolution operations with convolution kernel size of 1×1. The output vector can be regarded as channel-wise dependencies with the size of 1×1×c, which are used to indicate the importance of each channel of the convolution map.

The recalibrated feature map M can then be obtained by $$M = x \cdot y' = [x_1 y_1', x_2 y_2', \ldots, x_c y_c'] \quad (3)$$

In the obtained recalibrated feature map M, the discriminate feature information is highlighted by assigning the weight vector y'. In this module, the GAP is performed on all convolution channels of X, through which some useful information will be diminished. To retain the original information and improve the effectiveness, residual connection is introduced.

2) Non-local Attention Module (NLAM): In bearing diagnosis, each input information map is converted and built from a segment of monitoring data. Some features show long-range dependencies in the data, which include intrinsic operating signals, fault related impulse excitation, system periodic signals, etc. Different fault modes show different long-range dependencies. Enhancing the long-range dependencies related feature learning ability is critical for improving fault diagnosis efficiency. Further, the collected monitoring data come with noises, thus, how to reduce the effect of noise in the learning process is also important for fault diagnosis. To capture long-range dependencies and reduce the effect of data noise in DL, different non-local blocks are disclosed and analyzed in[21]. The non-local blocks are efficient in filtering useful information and omitting the effect of noise. In this work, a simplified NLAM is adopted to construct the network, through which the fault feature learning ability can be improved with slight increase in computation cost. The NLAM is assigned following the CAM to enhance the learning ability of this kind of long-range dependencies feature.

The core idea of NLAM is non-local operation, which computes a weighted mean of all signal points from different sensors in the input of NLAM module Y[22]. The long-range dependencies can be captured based on the appearance similarity, which is estimated by computing interactions between features at any two positions. The receptive field of the NLAM is the whole input. The non-local operation is defined as:

$$\phi_i = \frac{1}{C(y)} \sum_{\forall j} f(y_i, y_j) g(y_j) \quad (4)$$

where i is the feature index of an output position whose response is to be computed, and j is the index that enumerates all possible positions, f is a function to calculate the relationship between $y_i$ and all $y_j$, and C(y) is the normalization factor.

In the above NLAM, the attention weight ϕ is obtained by F' and softmax function. The simplification details can be found in[21]. The attentional feature maps are obtained by coupling the attention weight ϕ to the input of NLAM module Y by matrix multiplication. The transformed features are aggregated to the input of each position by element-wise addition operation. The residual connection enables inserting the attention module to any network without breaking or losing any original information. In the output of NLAM, the long-range dependent features, such as some periodic excitation signals caused by faults and operation behaviors, are emphasized, while useless information is suppressed. This process enhances the feature learning efficiency and reliability.

Figure 4:
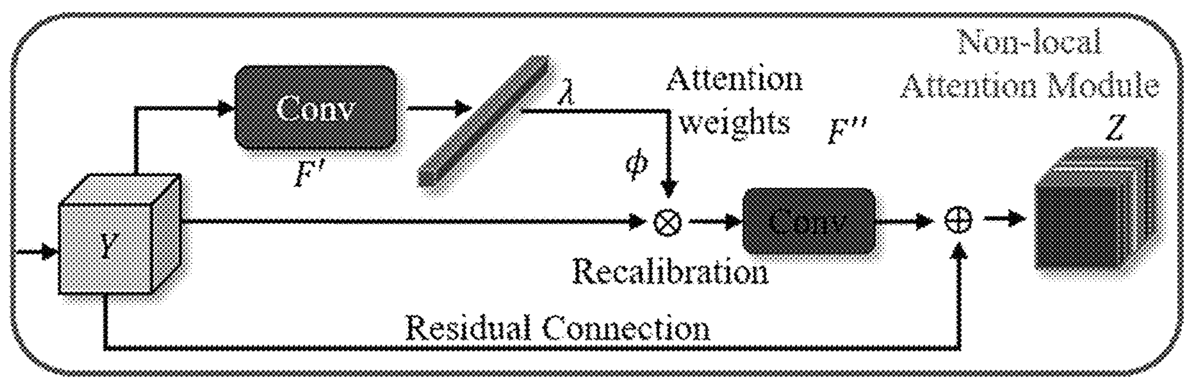
FIG. 4 illustrates a schematic diagram of an exemplary embodiment of a Non-local Attention Module (NLAM) for use in the presently disclosed exemplary embodiment of subject FIG. 2.

FIG. 4 illustrates the structure of NLAM in which the input feature maps Y are flatten by 1×1 convolution kernels. The attention weight vector ϕ of non-local channels is defined as $$\phi = \lambda(F'(Y))) \quad (5)$$

where λ is the softmax function, F' is the convolution operation with a 1×1 kernel.

The enhanced non-local fault related features can be obtained by $$Z = Y + F''(Y \cdot \phi) \quad (6)$$

where Z is the output of the attention module, F" is the convolution operation with 1×1 kernel, which is used to transform the size of the obtained attentional feature map to the size of the NLAM module input Y.

B. Deep Residual Convolutional Neural Network

CNN utilizes multiple types of functional layers to extract features[23]. A typical CNN structure consists of alternating convolutional layers, pooling layers, activation layers, and fully connected layers. The activation layers are often assembled after the convolutional layers and pooling layers. The features are extracted layer by layer from lower to upper. The convolution operation is conducted by applying convolution kernels on the given inputs (input images or the output of lower layers) to learn features in different scales. The pooling layer is performed to compress the output feature maps from the convolutional layers. Max pooling is one of the most common down-sampling techniques, which calculates the maximum value in each patch of each output feature map from previous layers. A softmax classifier is assembled following the fully connected layer to recognize fault modes.

For applications under variable operating conditions and complex working environments, networks with deeper structures are often used to get better results for diagnosis tasks. This makes the training of the networks difficult. More importantly, the accuracy saturates and degrades when the depth of the network exceeds a certain value[15],[24],[25]. The causes of the accuracy saturation issue are still open for research. In other words, increasing the depth of the CNN cannot always guarantee the improvement of performance.

The accuracy saturation and degradation in CNN can be avoided by designing residual learning units to form residual networks[25], which are also defined as directed acyclic graph (DAG) networks. Residual networks have residual connections by directly connecting the input and output of some functional layers. The residual connection provides a simple manner to propagate the parameter gradients through the network. With the residual networks, a deeper structure can be used to achieve high accuracy for complex diagnosis tasks.

Figure 5:
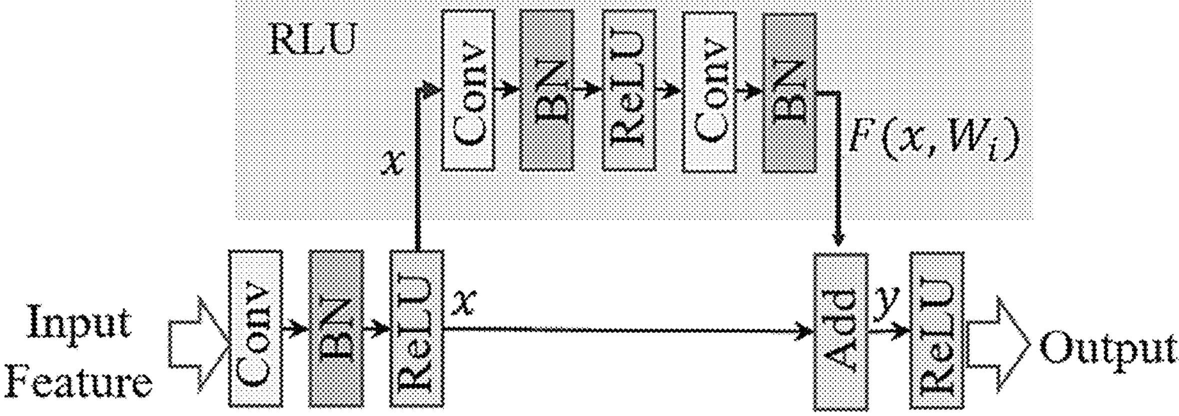
FIG. 5 illustrates a schematic diagram of an exemplary embodiment of a Residual Learning Unit (RLU) for use in the presently disclosed exemplary embodiment of subject FIG. 2.

With this consideration, this work adopts the residual learning unit (RLU) consisting of two convolutional layers, two Batch Normalization (BN) layers, and one ReLU activation layer, as shown in FIG. 5, to construct the residual networks. Note that a shortcut pathway is employed in the structure to connect the input and the output of the stacked layers directly. The problem of training very deep networks can be alleviated with the shortcut path structure. With this structure, the integrated RLU can be defined as:

$$y = F(x, W_i) + x \quad (7)$$

where x and y are the input and output of the residual structure, respectively, F is the residual function, which represents the residual mapping to be learned, $F(x, W_i)+x$ is operated by a shortcut connection and element-wise addition.

C. Data Conversion and Information Map Construction

Figure 6:
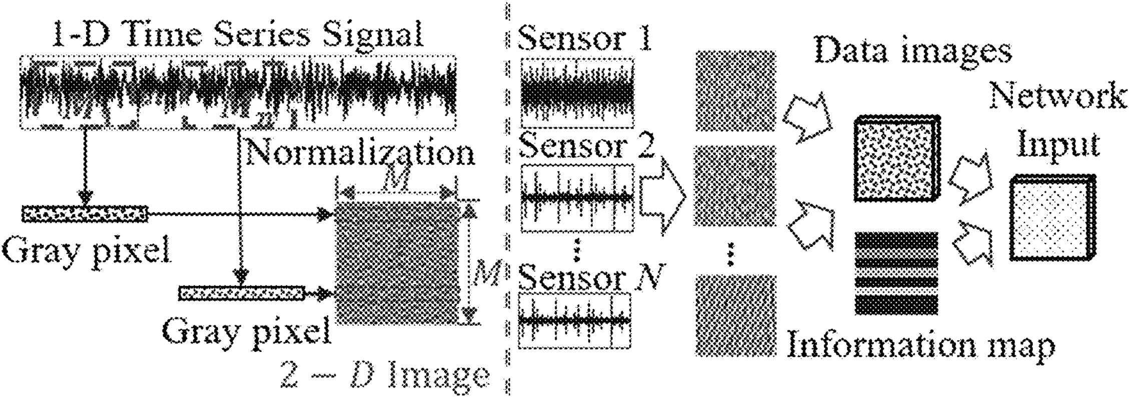
FIG. 6 illustrates a schematic diagram representing an exemplary embodiment of presently disclosed data conversion and combination procedure for use in the presently disclosed exemplary embodiment of subject FIG. 2.

1) Data conversion and combination: The raw 1-D time series vibration data are first converted to 2-D images. FIG. 6 is the data conversation and sample construction process. In data conversion, the raw data are divided into samples with length of $M^2$. To include at least one rotation of bearing data to each sample, the sample length is estimated with the consideration of the data sampling rates and bearing rotating speeds. These samples are then converted into 2-D grayscale images with the size of M×M. To this end, a sliding window with length of M is employed to divide each sample into M segments. The pixel intensity values of the first segment $M_1$ are obtained based on Eq. (8) and then used as the first row of the 2-D image. Based on this conversion strategy, the other rows of the 2-D grayscale image can be obtained. At the end, a 2-D image with the size of M×M can be obtained from each raw data sample. The 2-D images are then randomly separated into training and testing sets.

The pixel intensity values of the images are calculated by normalizing the raw data to the grayscale value in the range of (0, 255). By defining I(i, j) as the raw data, the pixel intensity of the images G at the coordination (i, j), $i,j \in [1, \ldots, M]$ can be calculated as:

$$G(i, j) = \text{round}\left\{ I(i, j) - I_{min} \times \frac{255}{I_{max} - I_{min}} \right\} \quad (8)$$

where $I_{max}$ and $I_{min}$ represent the maximum and minimum of the raw data I, and round(■) is the round function.

The data from multi-sensors are used to improve the diagnosis performance. For each fault mode, the raw data from N sensors are used in this work, the data images can be built with the size of M×M×N as FIG. 6.

2) Information map construction: Domain knowledge is the knowledge of a specific, specialized discipline or field [1 7]. In bearing fault diagnosis, domain knowledge includes fault mechanisms and expert empirical knowledge, such as bearing rotating mechanism, fault characteristics, and some common fault patterns that can be extracted from historical monitoring data, etc. This domain knowledge is critical for diagnosis. The powerful feature learning and fusion ability of DL-based approaches provide a solution for integrating complex heterogeneous domain knowledge in diagnosis process.

The operating conditions, such as rotating speeds and loads, have great effects on the monitoring data in terms of signal energy, amplitude, frequency, and noise terms. These effects throw some challenges on fault diagnosis, especially for systems that operates in variable conditions and working load. Therefore, it is desirable to integrate the information of operating conditions in the diagnosis process.

In this work, an information map is built to integrate the domain knowledge and operating condition in the input to the networks. To keep the data format of the information map consistent with the obtained data images, different operating conditions are represented with different gray-scales. First, an empty information map with the size of M×M is built. The background of the map is defined as the operating condition information represented by gray levels $o_{ij}$ given by:

$$o_{ij} = k^p \tag{9}$$

where $o_{ij}$ is the gray value at coordinate (i, j), k is the discretized rotating speeds or load levels, p=1 when k is the rotating speed level, p=2 when k is the load level.

Fault characteristics frequency (FCF) is the most important domain knowledge of rotating components, which is a representation of the fault mechanism. For example, bearing faults can occur at inner ring, outer ring, or rolling ball. When a fault occurs, the FCF components given below will appear in the vibration data. They can be calculated as $$f_{IR} = f_r \times \frac{N}{2}\left(1 - \frac{d_1}{d_2 \cos}\alpha\right) \tag{10}$$

$$f_{OR} = f_r \times \frac{N}{2}\left(1 - \frac{d_1}{d_2 \cos}\alpha\right) \tag{11}$$

$$f_{BA} = f_r \times \frac{N}{2d_1}\left(1 - \left(\frac{d_1}{d_2}\cos\alpha\right)^2\right) \tag{12}$$

where $F_{IR}$, $f_{OR}$, $f_{BA}$ are the fault characteristics frequency of inner race fault, outer race fault, and ball fault, respectively, N is the number of rolling elements, α is the contact angle, $d_1$ is the rolling element diameter, $d_2$ is the pitch diameter.

The FCFs are represented using different levels of gray band in the information map.

After estimating the FCFs, the ratio between the frequencies can be obtained as $f_{IR}$:$f_{OR}$:$f_{BA}$=a:b:c. Assume the dimension of the built operating information map is M×M, the relative locations of the three frequencies can be estimated on the information map. For example, the vertical location $i_{fIR}$ is estimated as:

$$i_{f_{IR}} = \frac{a}{a+b+c} \cdot M \tag{13}$$

The FCFs are integrated into the operating information map using three gray bands. The value of the gray band is set as 0.3. The gray band centered at the calculated frequency values, which include the neighboring areas, are used in the information map. The built information maps are then combined with the data images to build the network input, which has the size of M×M×(N+1), as shown in FIG. 6

D. Multi-task CNN based Fault Diagnosis

Figure 7:
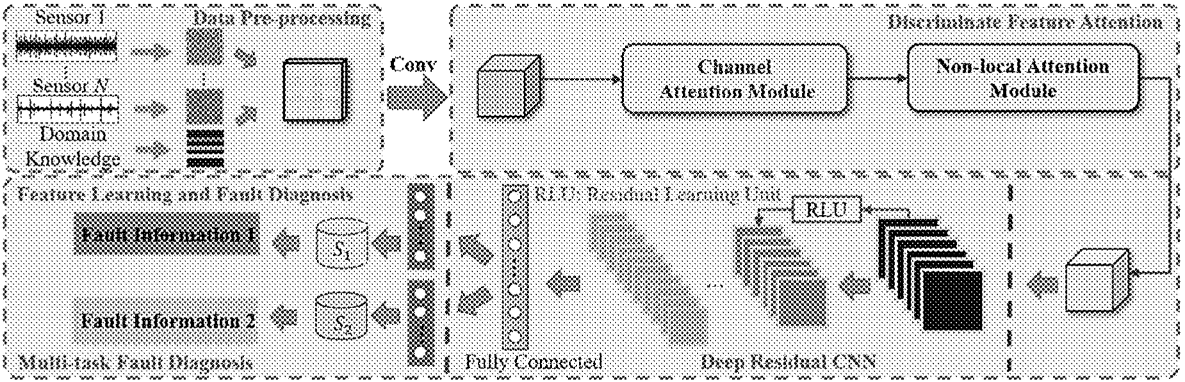
FIG. 7 illustrates a schematic diagram representing an exemplary embodiment of an overall framework of the presently disclosed multi-task bearing diagnosis method subject matter.

FIG. 7 shows the overall architecture of the disclosed approach, which includes data pre-processing, discriminate feature attention, feature learning, and multi-task task fault diagnosis. The domain knowledge is integrated into an information map, which is fused with monitoring data feature images from multi-sources as the input of the network. The discriminate feature attention section is composed of a sequentially connected CAM and a NLAM, which enhance the discriminate features learning ability with different mechanisms. The DR-CNN based feature learning network mainly consists of several alternating convolutional layers, BN layers, and ReLU activation layers. In this work, the RLUs are introduced by two shortcut connections as shown in FIG. 5. The dropout layer is also introduced to avoid the over-fitting problem. To achieve the classification for multi-tasks using one single network, the network is designed with multiple classifiers after the fully connected layer. FIG. 7 uses two classifiers, $S_1$ and $S_2$, as an example. The features are extracted layer by layer for both tasks, with each task having one independent fully connected layer and one classifier. The independent part can be trained separately based on the extracted features from the shared structure.

Using the fused information image as the network input, the DR-CNN can be trained for multi-task diagnosis. The training process is conducted based on Adam optimization algorithm[26]. To achieve high training accuracy and quick convergence for both tasks, the training process adjusts the learning rate dynamically according to a pre-defined exponential decay schedule, which is defined as:

$$\lambda = \beta_0 \cdot \exp(-\varphi \cdot t) \tag{14}$$

where $\beta_0$ is the initial learning rate, t is the training iteration number, and φ is a hyperparameter, $\beta_0$ and φ are estimated empirically by trial-and-error based on the training performance of the initial training stage.

II. EXPERIMENTAL RESULTS

To validate the performance of the disclosed multi-task CNN based rotating component fault diagnosis method, two bearing case studies with different experiment settings are conducted. The experiments are performed in MATLAB®

R2020b environment running on a computer with Intel® Core™ i7-6700 CPU@3.40 GHz(8CPUs) processor, 3.4 GHz 16G RAM.

A. Case 1: Machinery Fault Simulator-Rotor Dynamics Simulator Bearing Data

1) Data Description and Pre-processing: The first experiment uses the bearing data collected from the machinery fault simulator-rotor dynamics simulator[17]. Three bearings are mounted on the drive end, middle, and non-drive end of the testbed. For each bearing, three faults, which include outer race fault, inner race fault, ball fault, are injected in the bearings. The bearings are tested at ten different rotating speeds from 300 to 3000 r/min with a step increase of 300 r/min. The data are collected with a sampling frequency of 256 times the rotating speed. The bearings are tested with multi-sensors that are placed on the top of each bearing house. In this work, the data from two sensors at the drive end and middle are used.

The raw data are randomly split into training sets and testing sets with a length of 2500 data points. For the data from each sensor, the 1-D time series data is converted into 2-D grayscale images with the size of 50×50. The network input is built by combining the data images with the information map. The size of the network input is 50×50×3. For each fault mode, 1500 samples are used, and there are totally 6000 samples. To verify the accuracy and effectiveness of the presently disclosed approach, 3-fold cross-validation (CV) is conducted. The samples are randomly divided into three datasets {A, B, C}. In this case study, Task 1 and Task 2 are assigned as fault mode diagnosis and fault localization, respectively. For each data sample, it comes with two labels: One is 4 classes of fault mode (inner-race fault, outer-race fault, ball fault, normal) while the other one is 4 classes of fault locations (drive end bearing, middle bearing, non-drive end bearing, normal).

2) Multi-task DR-CNN based fault diagnosis: The training process is conducted based on the Adam optimizer[27]. Table I shows the detailed structure of the discriminate feature attention-based DR-CNN. The disclosed network adopts one RLU whose structure is highlighted with bold text. In the training process, the initial learning rate and dropout rate are set at 0.01 and 0.3, respectively. The mini-batch size of the input is 125. The training process is terminated when the epochs reach the pre-defined maximum epoch. The trained network is then used on testing set to validate the performance.

Figure 8A:
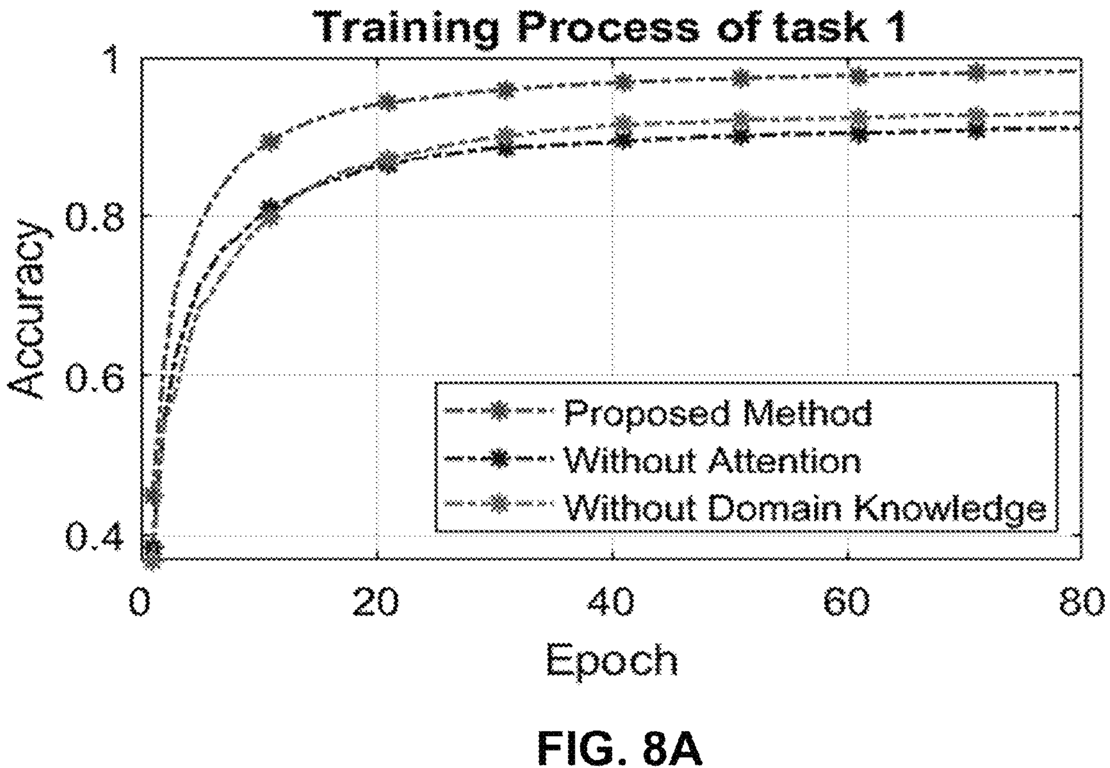
FIGS. 8A and 8B graphically show the training progress (accuracy) of presently disclosed Tasks 1 and 2, respectively, both with comparison of results without domain knowledge and without attention modules, with reference to presently disclosed Case 1.
Figure 8B:
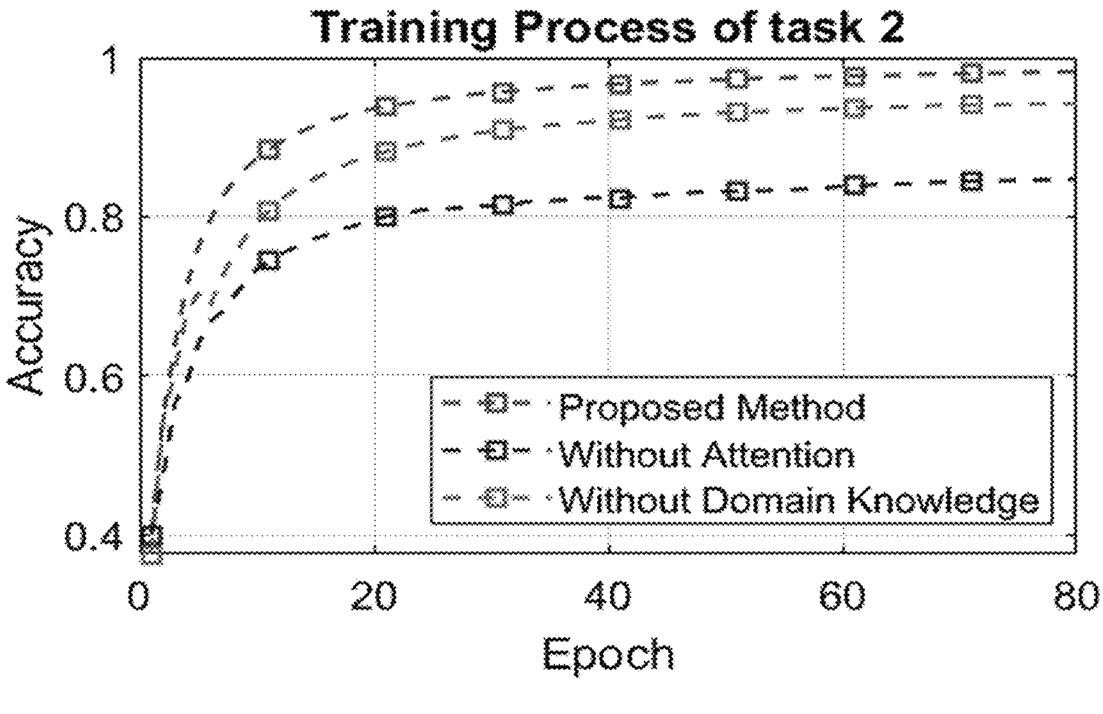
Figure 9:
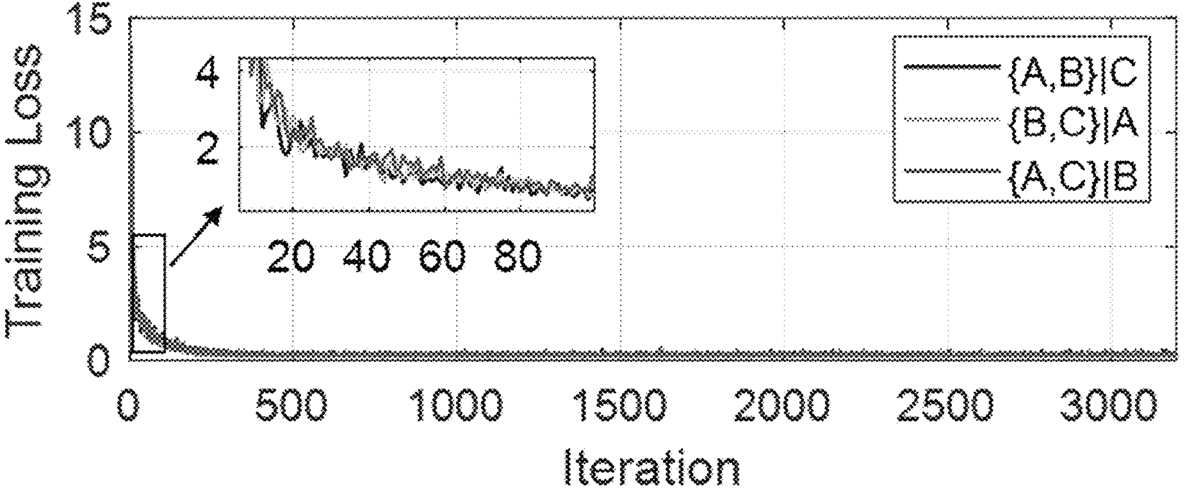
FIG. 9 graphically illustrates training loss of multi-task CNN, with reference to presently disclosed Case 1.

FIGS. 8A and 8B show the training progress of Tasks 1 and 2, respectively, both with comparison of results without domain knowledge and without attention modules. It is clear that the presently disclosed approach can achieve high accuracy with fast convergence speed for both tasks, which also demonstrate the benefits of integration of domain knowledge and attention modules. The convergence of the training loss in the whole process for the 3-fold CV is shown in FIG. 9. Note that the convergence of the 3-fold CV processes is all stable and fast.

TABLE I

STRUCTURE OF THE PROPOSED NETWORK IN CASE I

| Layer | Type | Filter size | Count | Output |
|---|---|---|---|---|
| 1 | Input | — | — | 50 × 50 × 3 |
| 2 | Convolution | 5 × 5 × 1 | 100 | 50 × 50 × 100 |
| 3 | Channel Attention | — | — | 50 × 50 × 100 |
| 4 | Non-local Attention | — | — | 50 × 50 × 100 |
| 5 | ReLU | 1 × 1 | 100 | 1 × 1 × 100 |
| 6 | Convolution | 5 × 5 × 3 | 30 | 5 × 5 × 3 |
| 7 | Max pooling | 2 × 2 × 3 | 30 | 5 × 5 × 3 |
| 8 | BN | — | 30 | 5 × 5 × 3 |
| 9 | Convolution | 5 × 5 × 3 | 30 | 5 × 5 × 3 |
| 10 | Max pooling | 2 × 2 × 3 | 30 | 5 × 5 × 3 |
| 11 | ReLU | — | — | 56 × 56 × 3 |
| 12 | Max Pooling | 4 × 4 × 3 | 30 | 53 × 53 × 3 |
| 13 | BN | — | — | 53 × 53 × 3 |
| 14 | ReLU | — | — | 53 × 53 × 3 |
| 15 | Dropout | — | — | 1 × 1 × 100 |
| 16 | Fully connected 1 | 1 × 1 × 100 | 4 | 1 × 1 × 4 |
| 17 | Softmax 1 | — | — | 1 |
| 18 | Fully connected 2 | 1 × 1 × 100 | 4 | 1 × 1 × 4 |
| 19 | Softmax 2 | — | — | 1 |

TABLE II

ACCURACY OF DIAGNOSIS WITH MFS-RDS DATA

| Task | Training/ Testing | Without Attention(%) | No Domain Knowledge(%) | Proposed(%) |
|---|---|---|---|---|
| Task1 | {A, B}\|C | 95.2 | 93.2 | 98.25 |
| | {A, C}\|B | 95.8 | 93.1 | 98.49 |
| | {B, C}\|A | 95.11 | 92.45 | 98.48 |
| | Average | 95.37 | 92.9 | 98.41 |
| Task2 | {A, B}\|C | 94.53 | 96.4 | 98.27 |
| | {A, C}\|B | 96.9 | 94.26 | 98.14 |
| | {B, C}\|A | 95.44 | 96.46 | 98.72 |
| | Average | 95.6 | 95.7 | 98.38 |

Table II lists the testing accuracy for the three CV combinations. The average training accuracies of both Tasks 1 and 2 can achieve 98.41% and 98.38%, respectively. To show the superiority of the disclosed approach, the results are compared with the structure without domain knowledge and without feature attention mechanisms, respectively. Based on Table II, the disclosed approach can improve the accuracies by about 5.5% and 2.7%, respectively, for fault diagnosis and localization compared with the structure without domain knowledge. The comparison with the structure without attention mechanism shows that the accuracies can improve about 3% and 2.8% for fault diagnosis and localization, respectively.

The method is then compared with a latest multi-task CNN based bearing fault diagnosis method[17]. The method uses bearing information map and the continuous wavelet coefficient matrices (CWCMs) of bearing data as the input of multi-task CNN, in which the domain knowledge is also integrated in the diagnosis process and a dynamic CNN is applied to classify the fault modes. Table Ill shows the accuracies of fault diagnosis and fault location. The disclosed method can improve the accuracies by about 2% in both diagnosis and localization. The results demonstrates that the disclosed method can achieve better performance than CWCM-CNN with less data processing.

TABLE III

| COMPARISON OF MULTITASK CNN | | | |
|---|---|---|---|
| Method | CWCM-CNN | CWCM-CNN with information map | Proposed |
| Task 1 (%) | 91.92 | 96.53 | 98.41 |
| Task 2 (%) | 93.09 | 96.36 | 98.38 |

To further validate the effectiveness of the disclosed approach, it is compared with some recent DL-based approaches, which include 1-D CNN[∞], hierarchical CNN (HCNN) with a matrix reconstruction method[29], deep CNN with wide first layer kernels (WDCNN)[30], dislocated time series CNN (DTS-CNN)[31]. The comparison results in Table IV show that the average accuracy of the disclosed approach has improvements about 20.17%, 15.61%, 11.58%, and 10.07%, respectively. Since these methods are single-task methods, only the accuracy of fault mode is compared.

TABLE IV

| COMPARISON OF FAULT MODE ACCURACY WITH DIFFERENT METHODS | | | | | |
|---|---|---|---|---|---|
| Method | 1D-CNN | HCNN | WDCNN | DTS-CNN | Proposed |
| Accuracy(%) | 78.24 | 82.80 | 86.83 | 88.34 | 98.41 |

B. Case 2: Rolling Element Bearing Testing Data

1) Data Description and Pre-processing: The bearings in this case study are tapered ball bearings. The data are collected from triaxial vibration sensors manufactured by Wilcoxon and AE (Acoustic Emission) sensors, which are placed in different directions with a sampling rate of 50 kHz. The experiments are conducted with different fault sizes under different rotating speeds and loads, as shown in Table V.

TABLE V

| EXPERIMENTAL DATA AND FAULT LABEL DESCRIPTION | | | | | | |
|---|---|---|---|---|---|---|
| Test No. | Width (micron) | Depth (micron) | Severity (micron) | Speed (rpm) | Load (psi) | Fault Level |
| B0 | 0 | 0 | 0 | 800 | 200 | F-1 |
| B1 | 35.33 | 2.46 | 37.79 | | | F-2 |
| B2 | 37.67 | 10.56 | 48.23 | | | F-3 |
| B3 | 48.33 | 2.38 | 50.71 | 1200 | 400 | F-4 |
| B4 | 49.33 | 4.88 | 54.21 | | | F-5 |
| B5 | 61.00 | 5.80 | 66.8 | | | F-6 |
| B6 | 64.00 | 11.00 | 75 | 1600 | 600 | F-7 |
| B7 | 131.3 | 1.40 | 132.7 | | | F-8 |

The fault size is measured by microns and the fault severity is evaluated by the sum of fault size in width and depth, Table V. For instance, bearing B1 in Table V has a fault severity of 35.33+2.46=37.79. Based on the severity, 8 fault levels are defined, which increase from F-1 (fault severity of 0) to F-8 (fault severity of 132.7). The raw data samples are with a length of 3600. With this setting, the size of the 2-D grayscale images is 60 x 60.

This study uses the data from two channels of vibration sensors and the AE sensor. The data are converted and combined with the information map to build the input of network. The input 2-D images have a size of 60×60×4. For each fault level, there are 1800 samples, which can be converted into 1800 images. With 8 fault levels, there are 14,400 grayscale images in total. By integrating domain knowledge, the combined images can be used as the input to the disclosed method. These combined images are separated into training set (9600 images) and test set (4800 images). For 3-fold CV, these images are also divided into three datasets {D, E, F}.

Figure 10A:
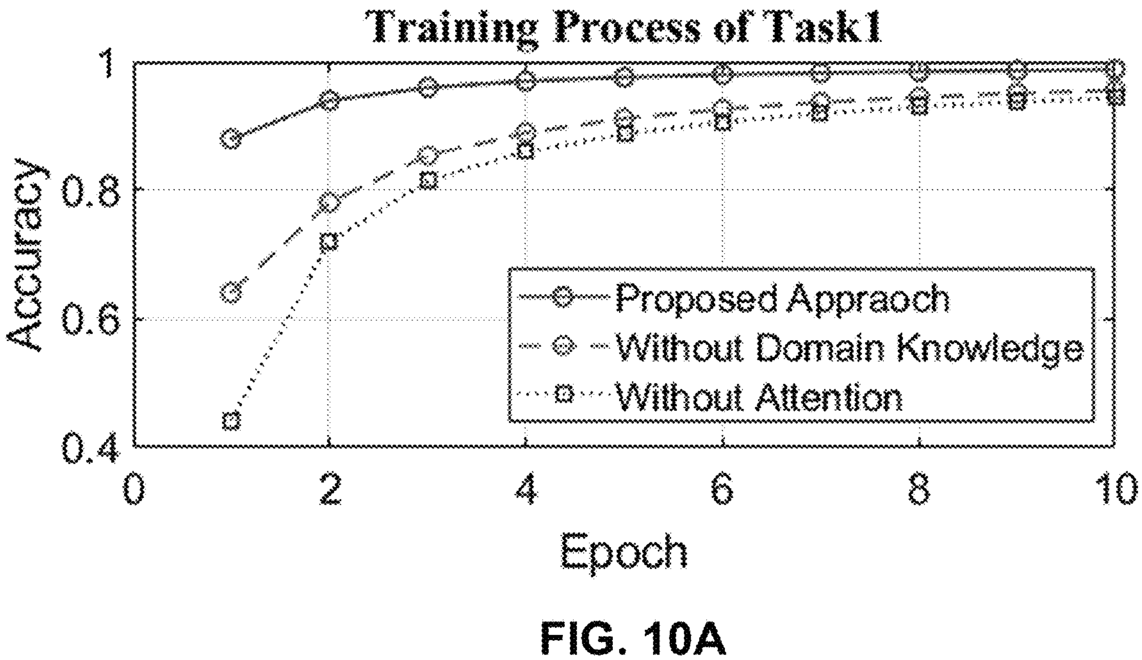
FIGS. 10A and 10B graphically show the training progress (accuracy) of presently disclosed Tasks 1 and 2, respectively, both with comparison of results without domain knowledge and without attention modules, with reference to presently disclosed Case 2.
Figure 10B:
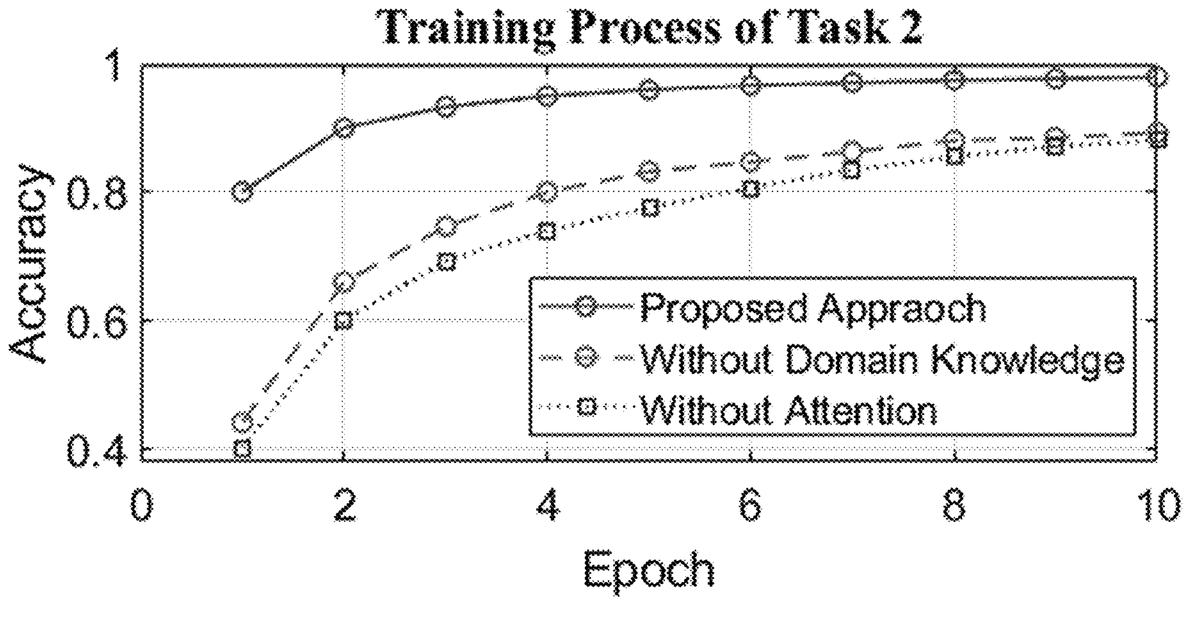

2) Multi-task CNN based fault diagnosis: Using the 2-D information map built from the data of two types of sensors and the corresponding domain knowledge, the discriminate feature attention-based DR-CNN is trained for multi-task fault diagnosis. In this case study, Task 1 is defined to diagnose the fault mode, while Task 2 is defined as identifying the bearing operating condition (speed) at the occurrence of the fault. The labels for Tasks 1 and 2 are 8 classes of fault dimension and 3 classes of rotating speed. The training procedure and parameters are consistent with that in Case 1. The structure is similar with that in Case 1 as described in Table I. The only differences are the size of the input and output of the network. The training processes of Tasks 1 and 2 are shown, respectively, in FIGS. 10A and 10B. Clearly, the training accuracy of both tasks converges at about 6 epochs. The training process has fast convergence and good accuracy for both tasks. The cross validation indicates the robustness of the disclosed approach.

The results are also compared with those from the structure without domain knowledge and feature attention mechanism. Table VI shows the testing results of cross validation and quantitative comparisons. The average diagnosis accuracies of Task 1 and Task 2 of the disclosed method can achieve 99.98% and 99.46%. Compared with the structure without attention mechanism and without domain knowledge, the disclosed method has about 4% and 3% improvement in Task 1 and about 11% and 9% improvement in Task 2, respectively.

TABLE VI

| ACCURACY OF FAULT DIAGNOSIS USING TAPERED ROLLING BEARING DATA (FAULT DIAGNOSIS/OPERATING SPEED IDENTIFICATION) | | | | |
|---|---|---|---|---|
| Task | Training/ Testing | Without Attention(%) | No Domain Knowledge(%) | Proposed(%) |
| Task1 | {D, E}\|F | 94.4 | 96.4 | 99.97 |
| | {D, F}\|E | 96.4 | 96.8 | 99.99 |
| | {E, F}\|D | 96.2 | 95.6 | 99.97 |
| | Average | 95.9 | 96.2 | 99.98 |
| Task2 | {D, E}\|F | 88 | 93.2 | 99.96 |
| | {D, F}\|E | 91.2 | 87.6 | 99.52 |
| | {E, F}\|D | 86 | 89.2 | 98.91 |
| | Average | 88.4 | 90 | 99.46 |

Figure 11:
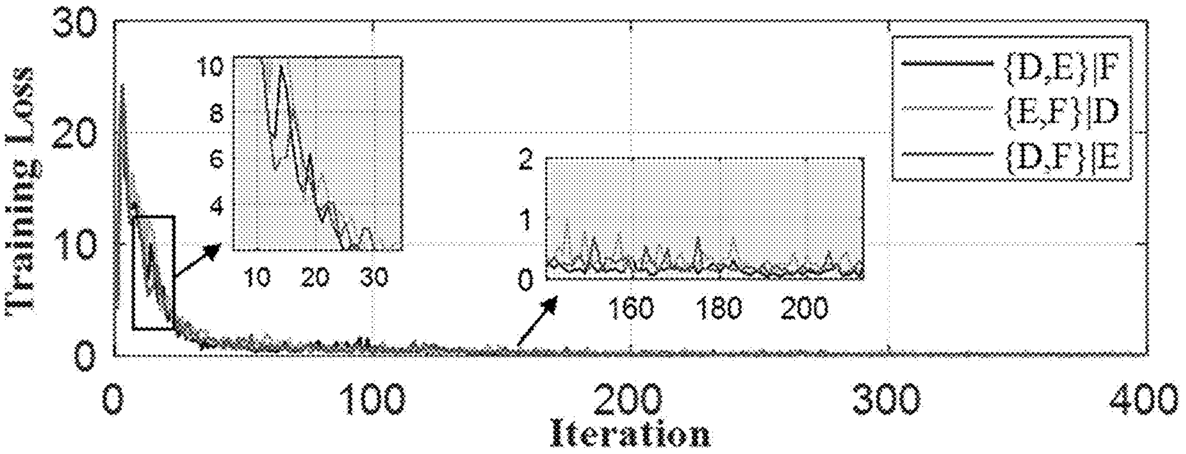
FIG. 11 graphically illustrates training loss of multi-task CNN, with reference to presently disclosed Case 2.

To show the convergence of the whole training process, FIG. 11 presents convergence curves of the 3-fold CV. It shows the overall loss after the training of each mini batch. Based on FIG. 11, all the training processes are fast and smooth, and the loss converges to close 0 at about 200 iterations. The fluctuations of all convergence curves are small, which demonstrates that the disclosed approach is stable and robust.

III. CONCLUSIONS

The presently disclosed subject matter relates to an enhanced discriminate feature learning-based DR-CNN for multi-task rotating component fault diagnosis. The raw data from multi-sensors are converted and fused with domain knowledge to build the information maps. Two different attention modules are employed to enhance the fault related discriminate features learning ability. The constructed discriminate feature attention DR-CNN structure with two classifiers is assembled and trained with dynamic training procedure using the fused information maps. Two case studies are conducted to verify the performance of the disclosed approach. Experimental results and comparisons show that the disclosed approach can achieve high training accuracy, fast convergence speed, and high diagnostic accuracy for multi-tasks with a single network. They demonstrate that the disclosed multi-task bearing diagnosis network is stable and robust in different applications.

This written description uses two bearing examples to disclose the presently disclosed subject matter, including the best mode, and also to enable any person skilled in the art to practice the presently disclosed subject matter, including making and using any devices or systems and performing any incorporated methods. The scope of the presently disclosed subject matter is defined by the claims, and may include other examples that occur to those skilled in the art. Such other examples are intended to be within the scope of the claims if they include structural and/or step elements that do not differ from the literal language of the claims, or if they include equivalent structural and/or elements with insubstantial differences from the literal language of the claims.

REFERENCES

[1] U. Satija, B. Ramkumar, and M S Manikandan, "A review of signal processing techniques for electrocardiogram signal quality assessment," IEEE reviews in biomedical engineering, vol. 11, pp. 36-52, 2018.

[2] M. Cerrada, R.-V. Sa'nchez, C. Li, F. Pacheco, D. Cabrera, J. V. de Oliveira, and R. E. Va'squez, "A review on data-driven fault severity assessment in rolling bearings," Mechanical Systems and Signal Processing, vol. 99, pp. 169-196, 2018.

[3] D. Wang, J. Zhong, C. Shen, E. Pan, Z. Peng, and C. Li, "Correlation dimension and approximate entropy for machine condition monitoring: Revisited," Mechanical Systems and Signal Processing, vol. 152, p. 107497, 2021.

[4] B. Zhang, C. Sconyers, C. Byington, R. Patrick, M. E. Orchard, and G. Vachtsevanos, "A probabilistic fault detection approach: Application to bearing fault detection," IEEE Transactions on Industrial Electronics, vol. 58, no. 5, pp. 2011-2018, 2010.

[5] D. Wang, J. Zhong, C. Li, and Z. Peng, "Box-Cox sparse measures: A new family of sparse measures constructed from kurtosis and negative entropy," Mechanical Systems and Signal Processing, vol. 160, p. 107930, 2021.

[6] X. Li, J. Wang, and B. Zhang, "Fault diagnosis of rolling element bearing weak fault based on sparse decomposition and broad learning network," Transactions of the Institute of Measurement and Control, vol. 42, no. 2, pp. 169-179, 2020.

[7] L. Wen, X. Li, L. Gao, and Y. Zhang, "A new convolutional neural network-based data-driven fault diagnosis method," IEEE Transactions on Industrial Electronics, vol. 65, no. 7, pp. 5990-5998, 2017.

[8] S. Zhang, S. Zhang, B. Wang, and T. G. Habetler, "Deep learning algorithms for bearing fault diagnostics—a comprehensive review," IEEE Access, vol. 8, pp. 29 857-29 881, 2020.

[9] H. Pan, X. He, S. Tang, and F. Meng, "An improved bearing fault diagnosis method using one-dimensional CNN and LSTM," J. Mech. Eng, vol. 64, no. 7-8, pp. 443-452, 2018.

[10] Z. Chen and W. Li, "Multisensor feature fusion for bearing fault diagnosis using sparse autoencoder and deep belief network," IEEE ons on Instrumentation and Measurement, vol. 66, no. 7, pp. 693-1702, 2017.

[11] G. Zhao, X. Liu, B. Zhang, G. Zhang, G. Niu, and C. Hu, "Bearing health condition prediction using deep belief network," in Proceedings of the Annual Conference of Prognostics and Health Management Society, Orlando, FL, USA, pp. 2-5, 2017.

[12] G. Niu, X. Wang, M. Golda, S. Mastro, and B. Zhang, "An optimized adaptive PReLU-DBN for rolling element bearing fault diagnosis," Neurocomputing, vol. 445, pp. 26-34, 2021.

[13] G. Li, C. Deng, J. Wu, X. Xu, X. Shao, and Y. Wang, "Sensor data-driven bearing fault diagnosis based on deep convolutional neural networks and S-transform," Sensors, vol. 19, no. 12, p. 2750, 2019.

[14] N. F. Waziralilah, A Abu, M. Lim, L. K. Quen, and A. Elfakharany, "A review on convolutional neural network in bearing fault diagnosis," in MATEC Web of Conferences, vol. 255, p. 06002. EDP Sciences, 2019.

[15] K. He, X. Zhang, S. Ren, and J. Sun, "Deep residual learning for image recognition," in Proceedings of the IEEE conference on computer vision and pattern recognition, pp. 770-778, 2016.

[16] G. Niu, E. Liu, B. Zhang, M. Golda, and S. Mastro, "A deep residual convolutional neural network based bearing fault diagnosis with multi- sensor data," in 2021 4th IEEE International Conference on Industrial Cyber-Physical Systems (ICPS), pp. 655-660. IEEE, 2021.

[17] S. Guo, B. Zhang, T. Yang, D. Lyu, and W. Gao, "Multi-task convolutional neural network with information fusion for bearing fault diagnosis and localization," IEEE Transactions on Industrial Electronics, vol. 67, no. 9, pp. 8005-8015, 2019.

[18] L. Chen, Q. Li, C. Shen, J. Zhu, D. Wang, and M. Xia, "Adversarial domain-invariant generalization: a generic domain-regressive framework for bearing fault diagnosis under unseen conditions," IEEE Transactions on Industrial Informatics, 2021.

[19] J. Feng, Y. Yao, S. Lu, and Y. Liu, "Domain knowledge-based deep- broad learning framework for fault diagnosis," IEEE Transactions on Industrial Electronics, vol. 68, no. 4, pp. 3454-3464, 2020.

[20] S. Woo, J. Park, J.-Y. Lee, and I. S. Kweon, "CBAM: Convolutional Block Attention Module," in Proceedings of the European conference on computer vision (ECCV), pp. 3-19, 2018.

[21] Y. Cao, J. Xu, S. Lin, F. Wei, and H. Hu, "GCNet: Non-local Networks Meet Squeeze-Excitation Networks and Beyond," in Proceedings of the IEEE/CVF International Conference on Computer Vision Workshops, pp. 0-0, 2019.

[22] X. Wang, R. Girshick, A. Gupta, and K. He, "Non-local neural net- works," in Proceedings of the IEEE conference on computer vision and pattern recognition, pp. 7794-7803, 2018.

[23] Z. Chen, A. Mauricio, W. Li, and K. Gryllias, "A deep learning method for bearing fault diagnosis based on cyclic spectral coherence and convolutional neural networks," Mechanical Systems and Signal Processing, vol. 140, p. 106683, 2020.

[24] R. Liu, F. Wang, B. Yang, and S. J. Qin, "Multiscale kernel based residual convolutional neural network for motor fault diagnosis under nonstationary conditions," IEEE Transactions on Industrial Informatics, vol. 16, no. 6, pp. 3797-3806, 2019.

[25] K. He and J. Sun, "Convolutional neural networks at constrained time cost," in Proceedings of the IEEE conference on computer vision and pattern recognition, pp. 5353-5360, 2015.

[26] D. P. Kingma and J. Ba, "Adam: A method for stochastic optimization," arXiv preprint arXiv: 1412.6980, 2014.

[27] E. Dogo, O. Afolabi, N. Nwulu, B. Twala, and C. Aigbavboa, "A comparative analysis of gradient descent-based optimization algorithms on convolutional neural networks," in 2018 International Conference on Computational Techniques, Electronics and Mechanical Systems (CTEMS), pp. 92-99. IEEE, 2018.

[28] F. Cong, J. Chen, G. Dong, and M. Pecht, "Vibration model of rolling element bearings in a rotor-bearing system for fault diagnosis," Journal of sound and vibration, vol. 332, no. 8, pp. 2081-2097, 2013.

[29] C. Lu, Z. Wang, and B. Zhou, "Intelligent fault diagnosis of rolling bearing using hierarchical convolutional network based health state classification," Advanced Engineering Informatics, vol. 32, pp. 139-151, 2017.

[30] W. Zhang, G. Peng, C. Li, Y. Chen, and Z. Zhang, "A new deep learning model for fault diagnosis with good anti-noise and domain adaptation ability on raw vibration signals," Sensors, vol. 17, no. 2, p. 425, 2017.

[31] R. Liu, G. Meng, B. Yang, C. Sun, and X. Chen, "Dislocated time series convolutional neural architecture: An intelligent fault diagnosis approach for electric machine," IEEE Transactions on Industrial Informatics, 1. 13, no. 3, pp. 1310-1320, 2016.2016.

What is claimed is:

1. A method for rotating component fault diagnosis, comprising:

receiving raw monitoring data from at least one monitoring sensor associated with one or more operating rotating components;

pre-processing the raw monitoring data to generate pre-processed monitoring data, including converting the raw monitoring data into 2-dimensional (2-D) grayscale images comprising pixel intensity values;

fusing the pre-processed monitoring data with rotating component bearing fault domain data and current operating conditions to build fused information maps, wherein the rotating component fault domain data and the current operating conditions are transformed into an information map having a same dimension as the 2-D grayscale images and having a background defined by gray levels representing the current operating conditions and gray bands representing fault characteristic frequencies, and wherein fusing the pre-processed monitoring data comprises combining the 2-D grayscale images with the information map;

processing the fused information maps through a machine-learned enhanced discriminate feature learning based deep residual convolutional neural network (DR-CNN) model trained to diagnose faults from the fused information maps, wherein the DR-CNN model includes a Channel Attention Module (CAM) and a Non-local Attention Module (NLAM) sequentially connected to capture long-range dependencies; and providing, as an output of the DR-CNN model, one or more sets of fault information regarding the one or more operating rotating components.

2. A method according to claim 1, wherein the DR-CNN model includes two classifiers employed for multi-task diagnosis.

3. A method according to claim 2, wherein the DR-CNN model is trained with a dynamic training procedure using the fused information maps built by fusing the pre-processed monitoring data with the rotating component fault domain data.

4. A method according to claim 2, wherein the one or more sets of fault information include at least one of fault mode diagnosis, fault localization, and operating condition at a time of fault detection.

5. A method according to claim 4, wherein the fault mode diagnosis includes inner-race fault, outer-race fault, ball fault, and normal, and the fault localization includes drive end bearing, middle bearing, non-drive end bearing, and normal.

6. A method according to claim 1, wherein the at least one monitoring sensor comprises a plurality of sensors associated with a plurality of bearings, said sensors including at least one of vibration sensors, triaxial vibration sensors, and Acoustic Emission (AE) sensors.

7. A method according to claim 6, wherein the plurality of sensors is placed in different directions and have a predetermined sampling rate.

8. A method according to claim 1, wherein the deep residual convolutional neural network (DR-CNN) model includes a residual learning unit (RLU) structure having two convolutional layers, two Batch Normalization (BN) layers, and one ReLU activation layer.

9. A method according to claim 8, wherein:

a shortcut pathway is employed in the RLU structure to connect an input of the RLU structure and an output of the RLU structure directly; and an integrated RLU is defined as:

$$y = F(x, W_i) + x$$

where x and y are the input and the output of the RLU structure, respectively, F is a residual function, which represents a residual mapping to be learned, and $F(x, W_i)+x$ is operated by the shortcut pathway connection and element-wise addition.

10. A method according to claim 9, wherein the rotating component fault domain data includes at least one of fault mechanisms, expert empirical knowledge, rotating mechanisms, fault characteristics, and common fault patterns that can be extracted from historical monitoring data.

11. A method of training an enhanced discriminate feature learning based multi-task deep residual convolutional neural network (DR-CNN) for rotating component fault diagnosis, comprising:

partitioning into segments 1-dimensional (1-D) monitoring data samples from monitoring sensors associated with one or more monitored rotating components;

converting the partitioned segments from the monitoring sensors into 2-dimensional (2-D) grayscale images comprising pixel intensity values;

transforming a set of domain knowledge about rotating component operations and faults and current operating conditions into information maps, wherein the set of domain knowledge and the current operating conditions are transformed into the information maps having a same dimension as the 2-D grayscale images and having a background defined by gray levels representing the current operating conditions and gray bands representing fault characteristic frequencies;

integrating the 2-D grayscale images with the information maps to build fused information images, which are used as input to the multi-task DR-CNN having multiple classifiers for multi-task diagnosis, wherein the multi-task DR-CNN includes a Channel Attention Module (CAM) and a Non-local Attention Module (NLAM) sequentially connected to capture long-range dependencies; and training the multi-task DR-CNN with the fused information images by using a dynamic training strategy to learn the rotating component fault diagnosis.

12. A method according to claim 11, wherein the segments are based on a sampling rate of the monitoring sensors and a rotating speed of the one or more monitored rotating components.

13. A method according to claim 11, wherein the training is terminated once DR-CNN performance satisfies predefined requirements or a training epoch reaches a predetermined threshold.

14. A method according to claim 13, wherein the training is terminated once the training epoch reaches at least 200 iterations.

15. A method according to claim 11, wherein the monitoring sensors comprise a plurality of sensors associated with a plurality of rotating components, said sensors including at least one of vibration sensors, triaxial vibration sensors, and Acoustic Emission (AE) sensors.

16. A method according to claim 11, wherein the multi-task deep residual convolutional neural network (DR-CNN) includes a residual learning unit (RLU) structure having two convolutional layers, two Batch Normalization (BN) layers, and one ReLU activation layer.

17. A method according to claim 11, wherein the set of domain knowledge includes at least one of fault mechanisms, expert empirical knowledge, rotating mechanisms, fault characteristics, and common fault patterns that can be extracted from historical monitoring data.

18. A method of using the trained multi-task DR-CNN of claim 11 to conduct the rotating component fault diagnosis, comprising providing input data sets of monitored rotating component sensor data to the trained multi-task DR-CNN, and operating the trained multi-task DR-CNN for outputting the rotating component fault diagnosis based on the monitored rotating component sensor data.

19. A method according to claim 18, wherein the outputted rotating component fault diagnosis includes at least one of fault mode diagnosis, fault localization, and operating condition at a time of fault detection.

20. A system for rotating component fault diagnosis, comprising:

one or more processors programmed for receiving raw monitoring data from at least one monitoring sensor associated with one or more operating rotating components, pre-processing the raw monitoring data to generate pre-processed monitoring data including converting the raw monitoring data into 2-dimensional (2-D) grayscale images comprising pixel intensity values, and fusing the pre-processed monitoring data with rotating component fault domain data and current operating conditions to build fused information maps, wherein the rotating component fault domain data and the current operating conditions are transformed into an information map having a same dimension as the 2-D grayscale images and having a background defined by gray levels representing the current operating conditions and gray bands representing fault characteristic frequencies, and wherein fusing the pre-processed monitoring data comprises combining the 2-D grayscale images with the information map; and a machine-learned enhanced discriminate feature learning based deep residual convolutional neural network (DR-CNN) model trained to diagnose rotating component faults from the fused information maps, for receiving and processing the fused information maps from the one or more processors, for outputting one or more sets of fault information regarding the one or more operating rotating components, wherein the DR-CNN model includes a Channel Attention Module (CAM) and a Non-local Attention Module (NLAM) sequentially connected to capture long-range dependencies.

21. A system according to claim 20, wherein the DR-CNN model includes two classifiers employed for multi-task diagnosis.

22. A system according to claim 21, wherein the DR-CNN model is trained with a dynamic training procedure based on the fused information maps built by fusing the pre-processed monitoring data with the rotating component fault domain data.

23. A system according to claim 21, wherein the one or more sets of fault information include at least one of fault mode diagnosis, fault localization, and operating condition at a time of fault detection.

24. A system according to claim 23, wherein the fault mode diagnosis includes inner-race fault, outer-race fault, ball fault, and normal, and the fault localization includes drive end bearing, middle bearing, non-drive end bearing, and normal.

25. A system according to claim 20, wherein the at least one monitoring sensor comprises a plurality of sensors associated with a plurality of rotating components, said sensors including at least one of vibration sensors, triaxial vibration sensors, and Acoustic Emission (AE) sensors.

26. A system according to claim 25, wherein the plurality of sensors is placed in different directions and have a pre-determined sampling rate.

27. A system according to claim 20, wherein the deep residual convolutional neural network (DR-CNN) model includes a residual learning unit (RLU) structure having two convolutional layers, two Batch Normalization (BN) layers, and one ReLU activation layer.

28. A system according to claim 27, wherein:

a shortcut pathway is employed in the RLU structure to connect an input of the RLU structure and an output of the RLU structure directly; and an integrated RLU is defined as:

$$y = F(x, W_i) + x$$

where x and y are the input and the output of the RLU structure, respectively, F is a residual function, which represents a residual mapping to be learned, and $F(x, W_i)+x$ is operated by the shortcut pathway connection and element-wise addition.

29. A system according to claim 28, wherein the rotating component fault domain data includes at least one of fault mechanisms, expert empirical knowledge, rotating mechanisms, fault characteristics, and common fault patterns that can be extracted from historical monitoring data.

* * * * *